Patented July 12, 1927.

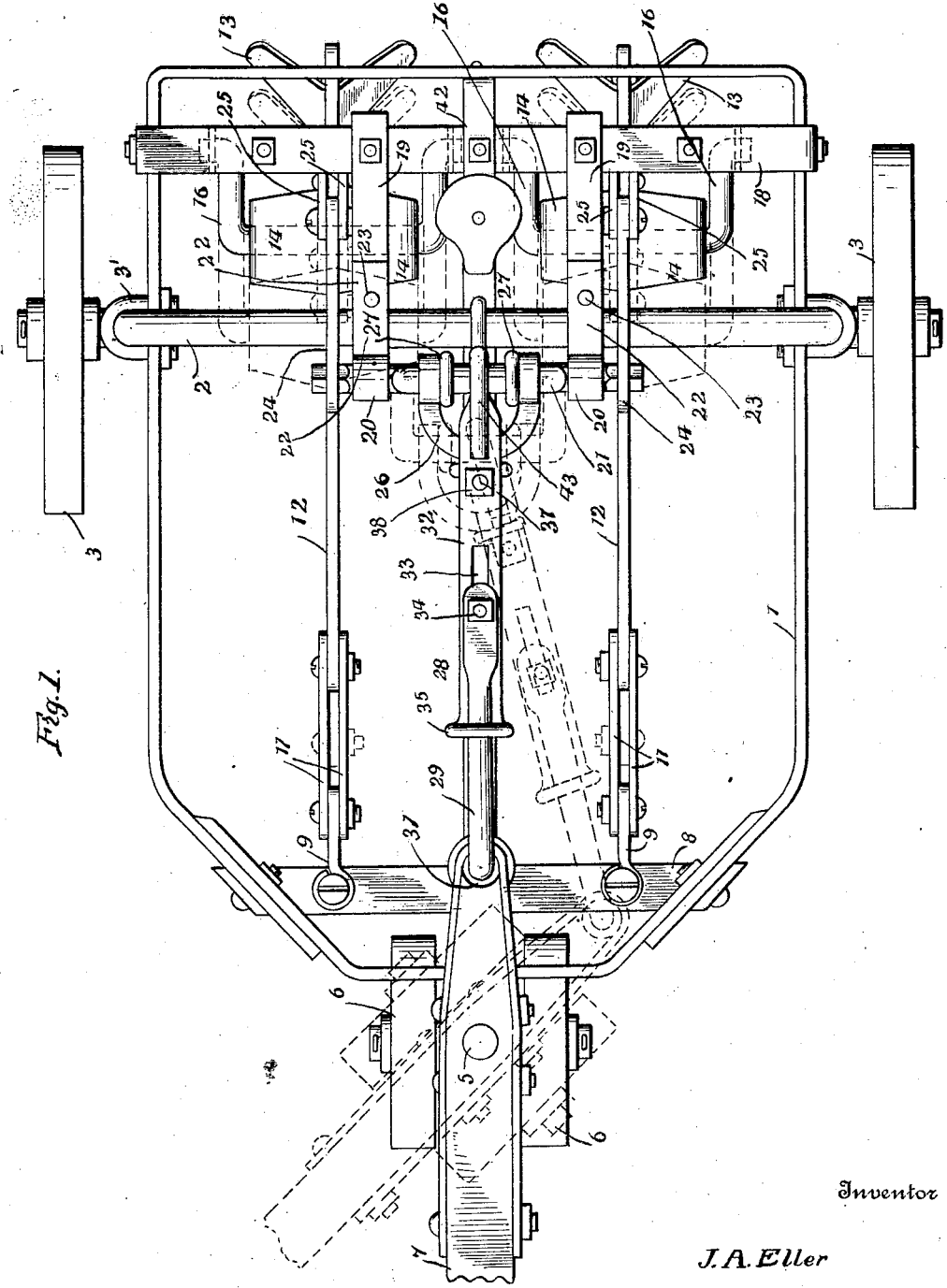

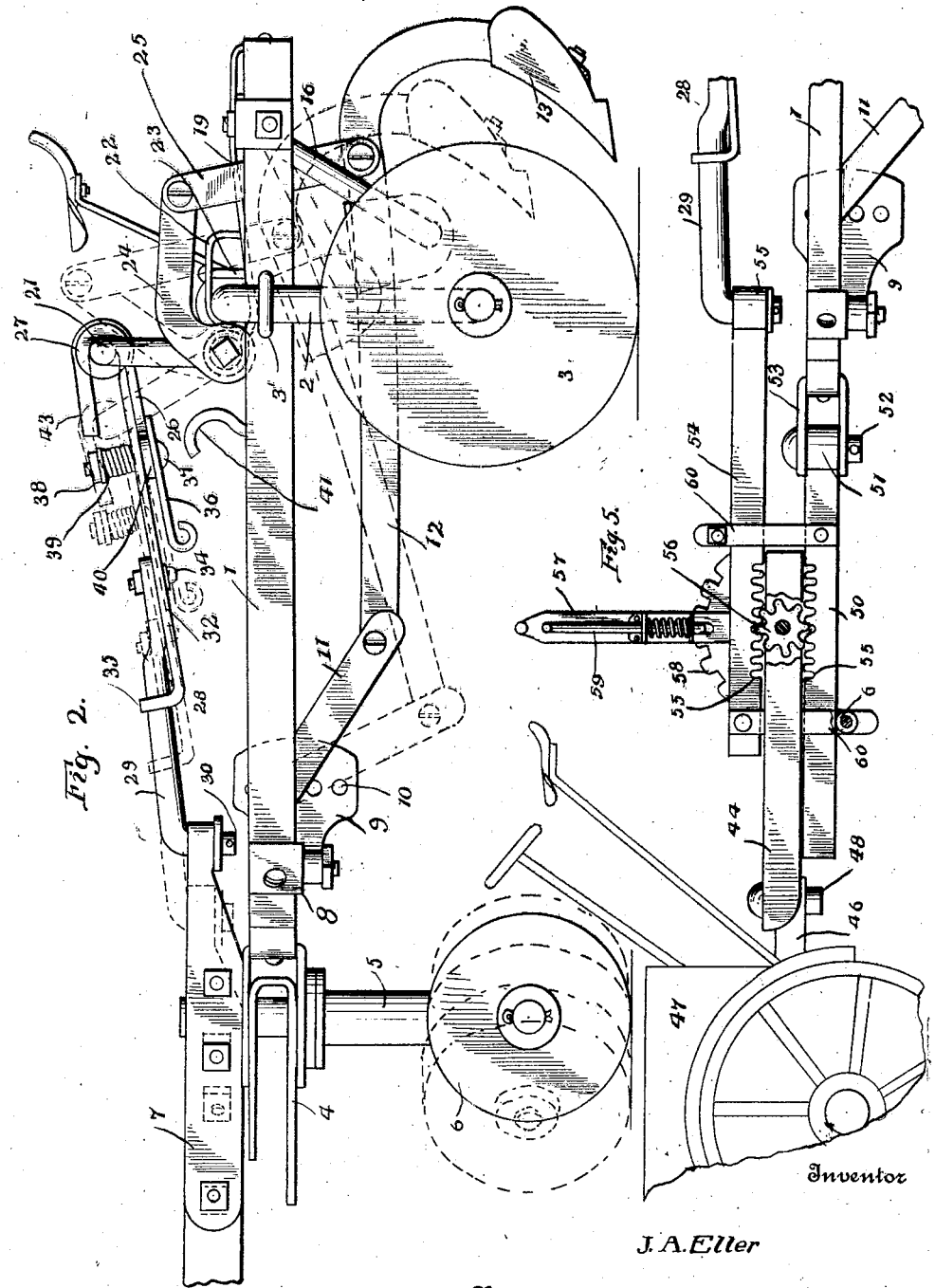

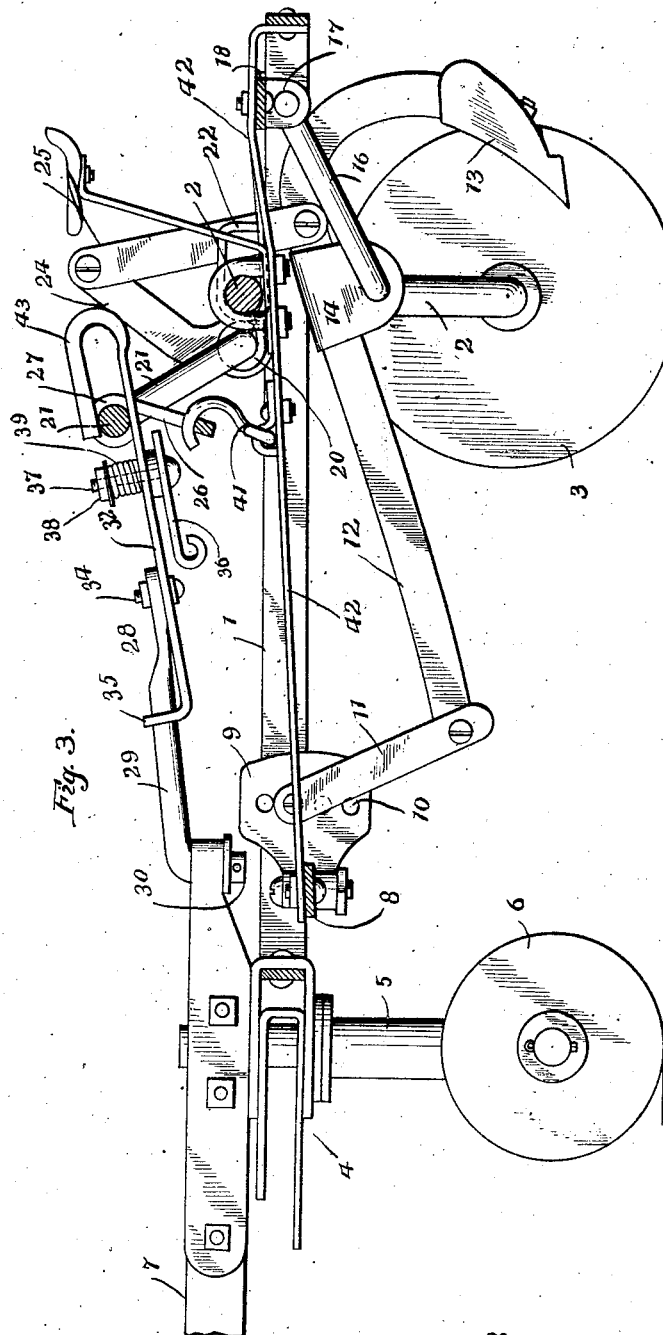

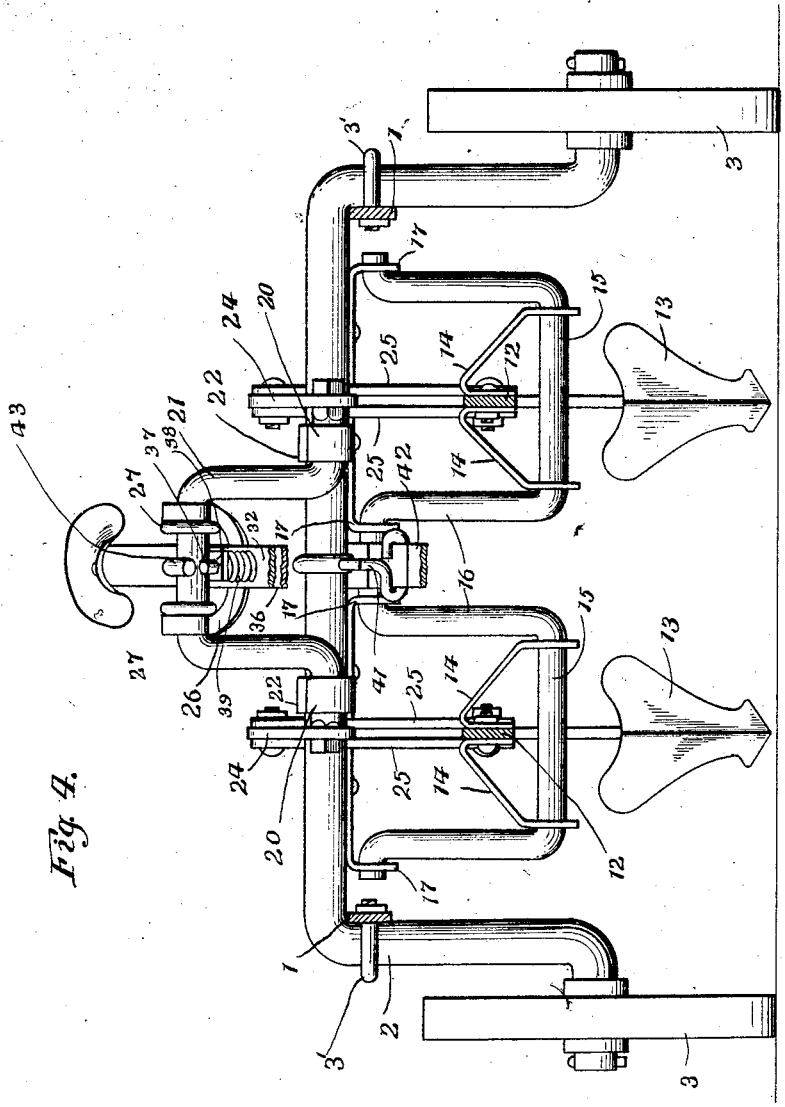

1,635,206

UNITED STATES PATENT OFFICE.

JACOB A. ELLER, OF CLOVIS, NEW MEXICO.

AGRICULTURAL MACHINE.

Application filed May 29, 1926. Serial No. 112,591.

This invention has for its object the provision of novel means whereby, when a tilling machine is to be turned, the blades or shares will be automatically lifted from the ground, and automatically returned to the ground when the straight away course is resumed. The invention also has for its object the provision of simple means whereby the soil-treating elements may be held suspended when the machine is being drawn over a road or moved from field to field and turning, loosening, or other action on the soil is not desired. Other incidental objects of the invention will appear in the course of the following description.

The invention is illustrated in the accompanying drawings, in which

Figure 1 is a plan view of a wheeled lister cultivator having my invention applied thereto;

Fig. 2 is a side elevation of the same;

Fig. 3 is a longitudinal vertical section showing the ground-engaging elements suspended to permit the machine to be drawn over a road;

Fig. 4 is a vertical transverse section;

Fig. 5 is a side elevation showing means for utilizing the invention when the machine is to be drawn by a tractor;

Fig. 6 is a top plan view, partly in section, of the coupling mechanism illustrated in Fig. 5.

The frame 1 may be of any well known type or preferred form and is shown in the accompanying drawings as provided with an arched axle 2 upon which ground wheels 3 are mounted, the arch of the axle extending over the frame and the frame being secured to the sides or columns of the axle in any convenient manner, as by clips 3'. When the machine is to be drawn by a team of draft animals, the front end portion of the main frame is connected to a fifth wheel or draft device 4 to which, in turn, the draft animals are to be hitched, and rotatably fitted in this draft device is a post or king bolt 5 carrying front steering wheels 6 at its lower end. The steering pole or tongue 7 is secured to the upper end of the king bolt or post 5 and projects rearwardly beyond the same, as clearly shown in Figs. 1 and 3. Near the front end of the main frame, there is rigidly secured a cross bar 8 and to the said cross bar are secured clevises 9 each having a vertical series of openings 10 therethrough in selected ones of which links 11 may be pivotally suspended. The lower ends of the links 11 are pivoted to the front ends of beams 12 which extend rearwardly and are equipped with lister blades 13 at their rear ends in the illustrated embodiment of the invention, although other soil-treating elements may be used. Near their rear ends, saddle brackets 14 are secured to the beams 12, and these brackets are hingedly or pivotally engaged upon the lower cross portions 15 of U-shaped hangers 16 which are pivotally mounted at their upper ends in lugs or bearing brackets 17 secured to the under side of a rear cross bar 18 of the main frame, it being readily understood that, if the hangers 16 be rocked about their upper ends, the beams 12 will be raised or lowered. Extending longitudinally of the main frame and secured rigidly to the rear cross bar 18 at opposite sides of the medial longitudinal line of the frame are supporting bars 19 which extend under the arch of the axle 2 and are provided at their front ends with eyes or collars 20 constituting bearings for a rocking crank shaft 21. Inverted U-shaped braces 22 bridge the axle immediately over the bearing bars 19 and are secured to the said bars by screws, or other equivalents, 23 so that the bars 19 will be firmly supported and will, in turn, firmly support the crank shaft 21. As shown clearly in Fig. 4, the shaft 21 is inverted U-shaped and rises above the axle of the machine and the main frame. To the ends of the shaft 21 are secured levers or cranks 24 which extend rearwardly over the axle and have their rear ends pivoted to the upper ends of links 25 which depend below the main frame and are pivoted to the beams 12 adjacent and in rear of the saddle brackets 14, as shown most clearly in Fig. 3. Loosely mounted upon the upper shoulder portion of the inverted U-shaped rock shaft 21 is a keeper 26 which is held against movement endwise of the shaft by stop collars 27 in an obvious manner. This keeper is essentially an arcuate plate spanning and having its central portion disposed below a pulling bar 28. This bar comprises a front member 29 having its front end 30 turned down so as to pivotally engage through an eye 31 at the rear end of the tongue 7, and a rear pulling member 32 which passes below the shoulder of the shaft 21 and has its rear extremity doubled upon itself so that its end overlies the said shaft, as shown in Fig. 3, whereby relative movement of the shaft may be permitted. The rear pulling member 32 is constructed with a longitudinal slot 33 through which a bolt 34, carried by the front member 29, may pass so that the two members 29 and 32 of the bar may be adjusted longitudinally and thereby set to accommodate machines of different lengths. This adjustment also enables the user of the device to accurately adjust the pulling bar so that the lifting of the soil-treating elements will be accomplished in the desired manner. The front end of the pulling bar member 32 is formed into a hook or eye 35 which engages over the front member 29 and thereby prevents the member 32 dropping from the front member. When the machine is in use, the keeper 26 fits against the under surface of the member 32, as shown in Fig. 2, and it is held in this position by a latch 36 carried by the said bar member 32 and having its rear end arranged to engage under the keeper 26 whereby the keeper will be held to the said member. The pivot bolt 37 upon which the latch is mounted passes upwardly therefrom through the bar 32 and is held against loss by a nut 38 on its upper end, a spring 39 being coiled around the bolt between the bar and the nut so as to permit the latch to be easily manipulated and at the same time maintain such frictional engagement between the same and an opposed surface that it will be held against accidental release. A spacer 40 is preferably fitted upon the bolt 37 between the bar 32 and the latch so that the end of the latch may engage under the keeper without excessive binding against the same or being apt to be bent or broken.

When the machine is to be drawn over a road or it is desired to maintain the soil-treating elements out of the ground, the latch 36 is moved to one side so that the keeper 26 may swing downwardly, as shown in Fig. 3, and a hook 41, carried by the central longitudinal bar 42 of the frame, is then engaged in the keeper so that the shaft 21 will be held in a forwardly rocked position and the soil-treating elements will be maintained in the elevated position illustrated in Fig. 3. It will be understood that, when the shaft 21 is rocked forwardly, the cranks 24 are swung upwardly and, consequently, a lifting force is exerted upon the beams 12 through the links 25.

It is thought the operation of the mechanism to automatically lift the blades or shares from the soil when a corner of a field, for instance, has been reached will be readily understood from what has been said. With the parts in the normal positions and the machine traveling straight ahead, the pulling bar will be alined longitudinally with the tongue 7, and, consequently, the overhanging hooked terminal 43 of said bar will not exert any pulling strain upon the shaft 21. When the team, however, is steered to one side so that the tongue 7 swings about the vertical axis of the post 5, as indicated by the dotted lines in Fig. 1, the eye 31 is, of course, moved laterally and a forward pull exerted upon the bar 28, whereupon the rear terminal 43 moves forwardly and rocks the shaft 21 to the position shown in Fig. 3 and by dotted lines in Fig. 2, so that the beams 12 and the elements carried by them will be lifted. The parts will, of course, automatically return to the initial position when the tongue resumes its straight ahead position. When the parts are arranged as shown in Fig. 3 so as to positively suspend the beams 12 in an elevated position, the shaft 21 moves forwardly in the doubled or hook-like terminal 43 of the pulling bar and is held by the hook 41 so that the bar then exerts no influence upon the shaft, even when swung to one side.

When the machine is to be drawn by a tractor, the draft device 4 and the front steering wheels, together with the tongue 7, are removed and the device shown in Figs. 5 and 6 is substituted therefor. In this device, there is employed a coupling 44 consisting of parallel side members connected at their front ends by a bridge piece 45 which is adapted to rest upon the drawbar 46 of the tractor, indicated at 47, a coupling bolt or pin 48 being inserted through an opening 49 provided in the bridge piece 45 and in a similar opening in the drawbar 46 of the tractor. A draft bar 50 is disposed below the coupling 44 and the rear end of this draft bar is provided with an eye 51 through which a pin or bolt 52 is inserted to pivotally attach to the draft bar a stirrup 53 which is, in turn, secured to the front cross bar of the frame 1. Disposed vertically over the draft bar 50 is a setting bar 54 which is provided at its rear end with an eye 55 receiving the downturned end of the pulling bar member 29, and the opposed edges of the bars 50 and 54 are constructed with racks 55 with which meshes a pinion 56 carried by the coupling 44 between the side members of the same and rotated by a hand lever 57 which is fixed to the axle or shaft of the pinion. A locking plate 58 is secured to one side of the coupling 44 and is engaged by a latch 59 mounted upon the lever 57 so that the parts will be held in any set position. To maintain the bars 50 and 54 in the proper relation and prevent separation of the same, while permitting relative longitudinal relative movement thereof, guiding bars or yokes 60 are each secured to one of the bars to project past the other bar, as shown in Fig. 5, rollers 61 being provided at the ends of the guiding bars so as to hold the bars 50 and 54 toward each other and in mesh with the pinion 56. By properly setting the lever, the draft bar 50 and the setting bar 54 will be caused to move longitudinally relative to each other and the pulling bar 28 will thereby be set so as to exert the proper pull upon the shaft 21 and also set the blades or other soil-treating elements to run at the desired depth in the ground.

With this tractor coupling attachment, when the tractor is steered to one side, the coupling 44 will move rigidly therewith and the draft bar 50 will turn upon the pivot bolt 52 relative to the frame 1. The setting bar 54, however, will move rigidly with the draft bar and the eye 55 will, consequently, be swung laterally so that a pull will be exerted upon the rock shaft 21 through the bar 28 in the same manner as in the first described embodiment of the invention. It will be noted upon reference to Fig. 5 that the lever 57 may be easily manipulated from the tractor seat.

When a machine is equipped with my invention, the operator may devote his entire attention to handling his draft team or operating the tractor inasmuch as it will not be necessary for him to adjust the blades or shares in the slightest degree when turning a corner or reversing his travel after reaching the side of a field. By elongating the pulling bar, the soil-treating elements will be set to run at a lower depth than would be the case if the bar be short, and by reason of this fact said elements can be easily set to run at any desired depth. Should the said elements choke for any reason the driver of the machine may easily reach down from the seat and lift the beams manually so as to clear the obstruction or remove the choking accumulation. To meet this emergency which sometimes, but not often, occurs, a hooked bar may be provided which will be carried loose upon the machine and which the driver may easily extend downwardly to engage under the beams 12 so as to lift them.

It will, of course, be understood that the invention is not limited to lister cultivators but may be applied to wheeled harrows, plows, and all types of tilling and planting machines.

Having thus described the invention, I claim:

1. The combination with an agricultural machine including an implement beam mounted for swinging movement in a vertical plane and a laterally swingable tongue, of a rock shaft mounted transversely above the beam, connections between the rock shaft and the beam, and a pulling bar pivoted at its front end to the tongue and engaged at its rear end with the rock shaft, the pulling bar being normally alined with the tongue and shiftable to angular relation thereto when the tongue swings laterally whereby to rock the shaft forwardly and lift the implement beam.

2. The combination with an agricultural machine having pivotally mounted beams and provided with a laterally swingable draft connection, of a rock shaft mounted on the machine, connection between the said rock shaft and the beams whereby forward movement of the rock shaft will raise the beams, a pulling bar connected at its front end with the draft connection and operatively engaged at its rear end with the rock shaft whereby to rock the shaft forwardly when the draft connection swings laterally.

3. The combination with an agricultural machine having pivotally supported beams and a laterally swingable draft connection, of a rock shaft mounted upon the machine and operatively connected with the beams whereby forward movement of the rock shaft will raise the beams, a pulling bar connected with the draft connection and having a lost-motion connection with the rock shaft, a keeper suspended on the rock shaft, means for holding the keeper to the pulling bar whereby said bar may actuate the rock shaft, and a hook upon the machine adapted to engage the keeper when released from the pulling bar whereby the beams will be held in a raised position.

4. The combination of an agricultural machine having pivotally mounted beams and a laterally swingable draft connection, a rock shaft on the machine operatively connected with the beams, an extensible pulling bar pivotally connected at its front end with the draft connection and having a lost-motion connection with the rock shaft at its rear end, a keeper carried by the rock shaft, and a latch on the pulling bar to engage said keeper whereby to maintain operative relation between the pulling bar and the rock shaft.

5. The combination with an agricultural machine having pivotally mounted beams and a laterally swingable draft connection, a rock shaft on the machine, operative connections between the rock shaft and the beams whereby forward movement of the rock shaft will raise the beams, a pulling bar pivoted at its front end to the draft connection and having a lost-motion connection at its rear end with the rock shaft, a keeper carried by the rock shaft and passing under the pulling bar, a latch mounted on the pulling bar and engaging under the keeper, and means for maintaining frictional engagement between the latch and the keeper.

6. The combination with an agricultural machine having pivotally mounted beams, means for applying draft to the machine including a draft bar having pivotal connection with the front end of the frame, a setting bar movable laterally with the draft bar, means for shifting the setting bar longitudinally with respect to the draft bar, and means whereby lateral movement of the bars will effect raising of the beams.

7. The combination with an agricultural machine including a frame, a beam suspended thereon for rocking movement in a vertical plane and a laterally swingable connection at the front end of the frame, of a rock shaft mounted upon the frame and having a normally upstanding crank and a normally rearwardly extending crank, a link connecting the rearwardly extending crank with the beam, and a pulling bar engaged at its front end with the draft connection and at its rear end with the normally upstanding crank of the rock shaft whereby to rock the shaft forwardly and lift the beam when the draft connection swings laterally.

In testimony whereof I affix my signature.

JACOB A. ELLER. [L. S.]